United States Patent [19]

Tulpule et al.

[11] Patent Number: 5,202,679

[45] Date of Patent: Apr. 13, 1993

[54] MID-VALUE SIGNAL SELECTION SYSTEM

[75] Inventors: Bhalchandra R. Tulpule, Farmington; Steven A. Avritch, Bristol, both of Conn.

[73] Assignee: United Technologies Corporation, Hartford, Conn.

[21] Appl. No.: 678,500

[22] Filed: Apr. 1, 1991

[51] Int. Cl.$^5$ .............................................. H04Q 7/00
[52] U.S. Cl. ......................... 340/825.160; 340/825.03; 340/825.3; 340/146.2
[58] Field of Search ...................... 340/825.16, 825.03, 340/146.2, 825.3, 825.04; 307/355, 357, 441, 219; 328/147, 154, 137, 117; 371/67.1, 68.1, 68.2, 37.9, 8.2; 364/433, 715.01

[56] References Cited

U.S. PATENT DOCUMENTS

| | | | |
|---|---|---|---|
| 3,596,107 | 7/1971 | Kittrell | 307/357 |
| 4,455,820 | 6/1984 | Buckley, Jr. et al. | 364/431.02 |
| 4,472,806 | 9/1984 | Blair | 371/68.1 |
| 4,771,427 | 9/1988 | Tulpule et al. | 371/8.2 |
| 4,899,127 | 2/1990 | Kawai et al. | 340/146.2 |
| 4,918,636 | 4/1990 | Iwata et al. | 340/146.2 |

*Primary Examiner*—Donald J. Yusko
*Assistant Examiner*—Edwin C. Holloway, III
*Attorney, Agent, or Firm*—Richard H. Kosakowski

[57] ABSTRACT

A signal selection system has input thereto a plurality of redundant input signals having varying values along with signals indicative of the validity of the plurality of input signals, comparison logic compares all possible pairwise combinations of the input signals to determine which input signal in each of the input signal pairs has the greater value or to determine if the input signals in each pair have equal values. Mid value selection logic determines which one or more of the values of the input signals from the plurality of valid input signals are to be used to determine the output signal according to a mid value selection criterion. The selection logic has a plurality of combinational logic elements arranged to execute predetermined Boolean logic equations in determining which one or more of the values of the input signals from the plurality of valid inputs are to be used to determine the output signal according to the predetermined mid value selection criterion.

14 Claims, 3 Drawing Sheets

MID-VALUE SIGNAL SELECTION SYSTEM

DESCRIPTION

1. Technical Field

This invention relates to a fast hardware implementation of a signal selection system, and more particularly to such a system for determining a particular signal value from among a plurality of signal values.

2. Background Art

In embedded control systems such as an aircraft flight control computer, the gathering and distributing of data is usually performed by an Input Output Controller (IOC). Typically, the IOC may take the form of a software programmable microprocessor in which the data gathering function is carried out by software embedded in the microprocessor.

The software-implemented algorithms used in the IOC data gathering function are well defined and mature. An example of an IOC requirement in the data gathering function is for the IOC to sample a number of signals and determine a selected 'best' signal therefrom. For example, the IOC may have to determine the signal representing the mid value from among a plurality of sensed redundant signals having varying values. Traditionally this mid value select function is carried out by the IOC in software by a "middle of the group" algorithm.

However, as modern controls become more complex in terms of the quantity and redundancy levels of signals to be input to the IOC, these traditional software approaches to various signal management tasks tend to require greater implementation and test out time in the design phase. More importantly, as the number of inputs grows, there is an increase in the IOC processing time required to execute the sequential software approach. Also, it is unlikely that the general purpose processors often used to implement the control processor will be fast enough to provide adequate throughput in these more complex modern systems.

One approach to increase the speed of execution of this mid value selection algorithm is to parallelize it as much as possible; i.e., do as many tasks in parallel as possible. However, this approach is not attractive in that it requires a large number of discrete logic gates and a corresponding large number of test cases for 100% logic check out and verification. Also, the mid value selection algorithm is sequential in nature. It is not obvious how this can be converted into an equivalent parallel algorithm so that it can be executed rapidly. Another drawback is that the execution time of the algorithm is data dependent, requiring large testing time.

DISCLOSURE OF INVENTION

Objects of the present invention include the provision of signal selection apparatus comprising a parallel arrangement of digital logic that is improved in execution time over the prior art systems characterized by sequential software algorithmic execution.

Further objects include the provision of the digital logic apparatus which retains the flexibility enjoyed by prior art sequential software approaches in that different sets of input signals may be supplied without retesting the algorithms fixed in hardware.

Still further objects include the provision of the digital logic apparatus which eliminates the data dependent paths in the prior art sequential software algorithms so that the digital logic executes in an identical manner regardless of input signal values, and produces its selected result in the same time regardless of the signal redundancy level.

According to the present invention, a signal selection system has input thereto a plurality of redundant input signals having varying values, a parallel arrangement of comparison logic simultaneously compares all possible pairwise combinations of the inputs to determine which input in each of the input pairs has the greater value or to determine if the inputs in each pair have equal values, the result of each comparison is fed to selection logic which determines the one or more of the inputs to be used to determine the output signal according to a predetermined selection criterion, the selection logic having a plurality of combinational logic elements arranged in parallel to execute predetermined Boolean logic equations in determining the one or more of the values of the inputs from the plurality of inputs to be used to determine the output signal according to the predetermined selection criterion.

In further accord with the present invention, the selection logic comprises mid value selection logic which determines from the results of each comparison which one or two of the plurality of inputs has a value which meets the predetermined selection criterion that represents the mid value from among the values of the plurality of inputs.

In still further accord with the present invention, each input presented to the comparison logic represents a multiple bit digital word, the comparison logic comprising bit serial logic elements for performing the comparison operations serially on each bit of the multiple bit inputs.

In still further accord with the present invention, signals indicative of the validity of the plurality of input signals are fed to the selection logic along with the comparison signals, the selection logic determining in response thereto the one or more of the values of the inputs from the plurality of valid inputs to be used to determine the output signal according to the predetermined selection criterion.

The present invention has utility in providing for a flexible, parallel-executing algorithm hardwired in digital logic which executes at a significantly higher throughput than prior art sequential software implementations. The present invention represents an improvement over these prior art software systems in that it can manage a large amount of input/output tasks without a real time penalty to the main control processor. In addition, by being hardwired the algorithm is not changeable; therefore it reduces testing time. The flexibility of a software algorithm is retained because different redundant sets of input signals can be accomodated. Also, computation time in hardware is fixed and is independent of the data, which has the additional benefit of eliminating the testing burden associated with the data dependent execution paths in the prior art sequential software implementations.

These and other objects, features and advantages of the present invention will become more apparent in light of the detailed description of an exemplary embodiment thereof, as illustrated in the accompanying drawings.

BEST MODE FOR CARRYING OUT THE INVENTION

Figure 1:
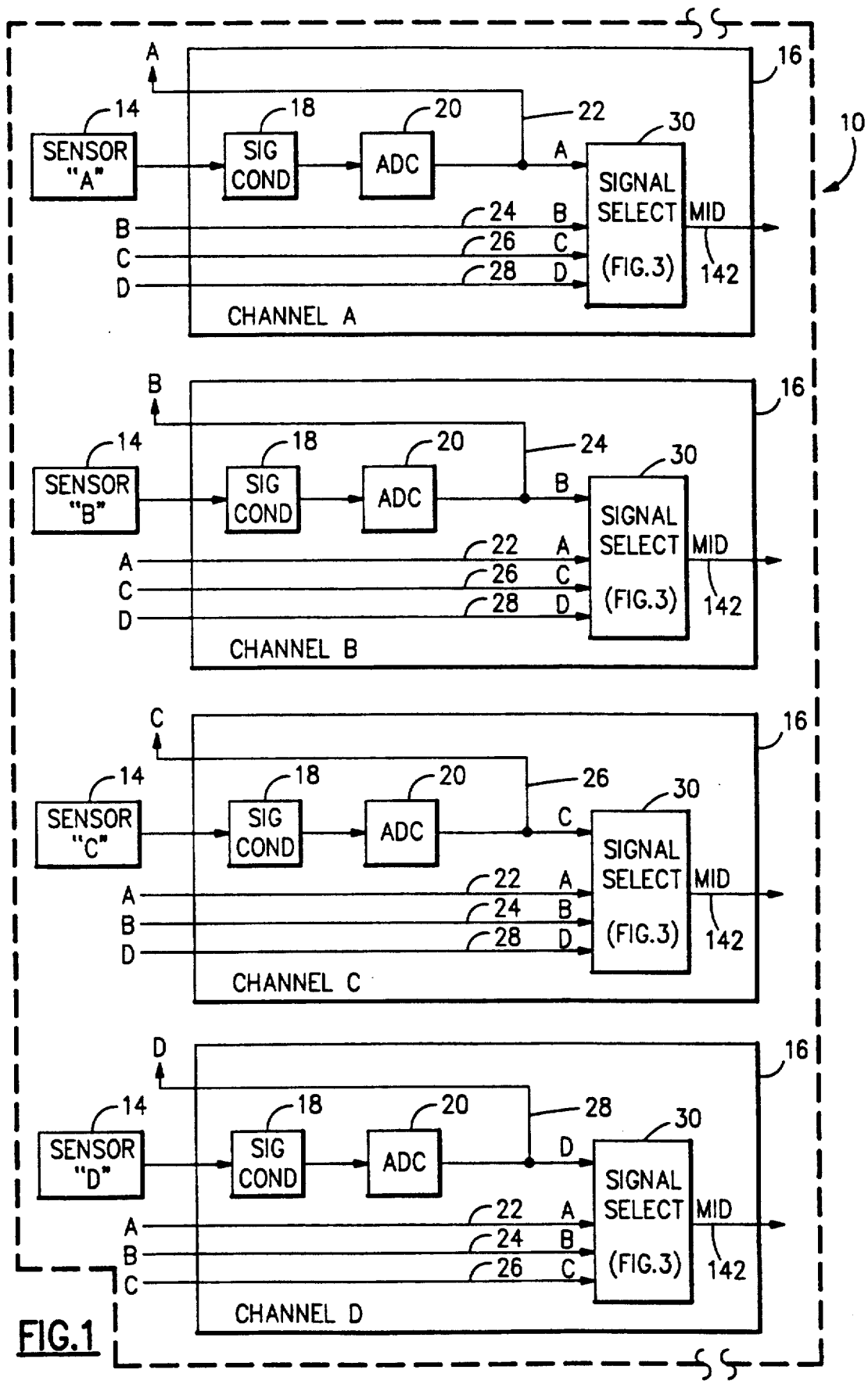
FIG. 1 is a diagram illustration of a portion of an aircraft flight controller in which the present invention may be implemented.

In FIG. 1 is illustrated a block diagram of a portion of an aircraft flight controller 10. The controller 10 forms an exemplary embodiment in which the signal selection apparatus of the present invention may be implemented. The apparatus executes a mid value select function. Specifically, the apparatus has input thereto a plurality of sensed redundant signals from which it determines the one or two signals which represent the mid value from among all of the redundant signals.

Figure 2:
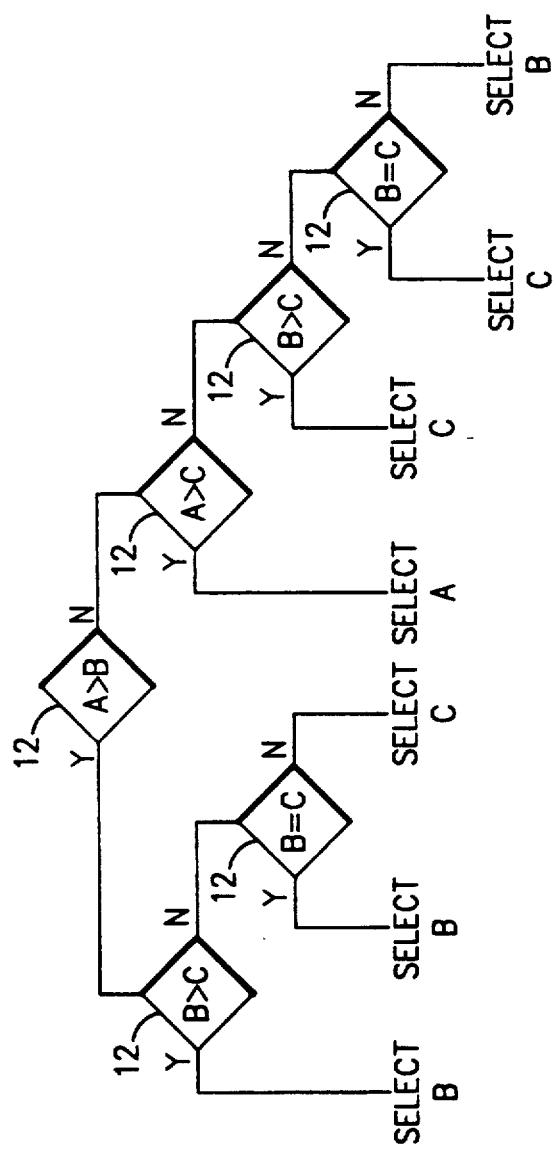
FIG. 2 is a flow chart diagram of a prior art sequential software approach to a mid value selection algorithm.

In FIG. 2 is illustrated a flow chart of a typical prior art sequential software approach to a mid value select algorithm (i.e., a "middle of the group" algorithm) for a system having three redundant signal inputs A,B,C. The algorithm executes the appropriate sequence of decision blocks 12 until a mid value is selected. Problems with this software approach include the data dependency of the execution time. That is, the three input system of FIG. 2 is fairly simplistic. However, for a system having four or more redundant signals (i.e., an increase in data) the resulting flow chart becomes much larger, with a corresponding increase in software execution time and data dependent execution paths.

Referring again to FIG. 1, the signal selection system operates on four input signals. However, the present invention may be used with more or less than four inputs, in light of the teachings herein. The input signals originate from corresponding redundant analog sensors 14. Each redundant sensor 14 interfaces with a corresponding redundant channel 16 in the controller. The redundant sensors all sense the same signal associated with a given parameter of aircraft operation, e.g., position, temperature, pressure, etc.

The sensed signals undergo conditioning by circuitry 18 in each channel. The conditioned analog signals are then converted to corresponding digital signals by known analog to digital converter (ADC) circuitry 20 in each channel. Each ADC output signal is represented by, e.g., a 16-bit digital signal A,B,C and D, on corresponding signal lines 22-28. However, the multiple bit digital signal may be of any length, the length being chosen as desired so as to properly convey the necessary amount of information within the signal. The digital signals are fed to signal select logic 30 in each channel. The signal select logic 30 is described in further detail hereinafter with respect to FIG. 3.

It is to be understood that for the broadest scope of the present invention, the analog signal sensing and conditioning scheme of FIG. 1 is not required. The present invention is not concerned with how the multiple bit digital signals are derived before presentation to the signal select logic 30. It suffices for the broadest scope of the present invention that a plurality of multiple bit digital signals are fed to the signal select logic.

Figure 3:
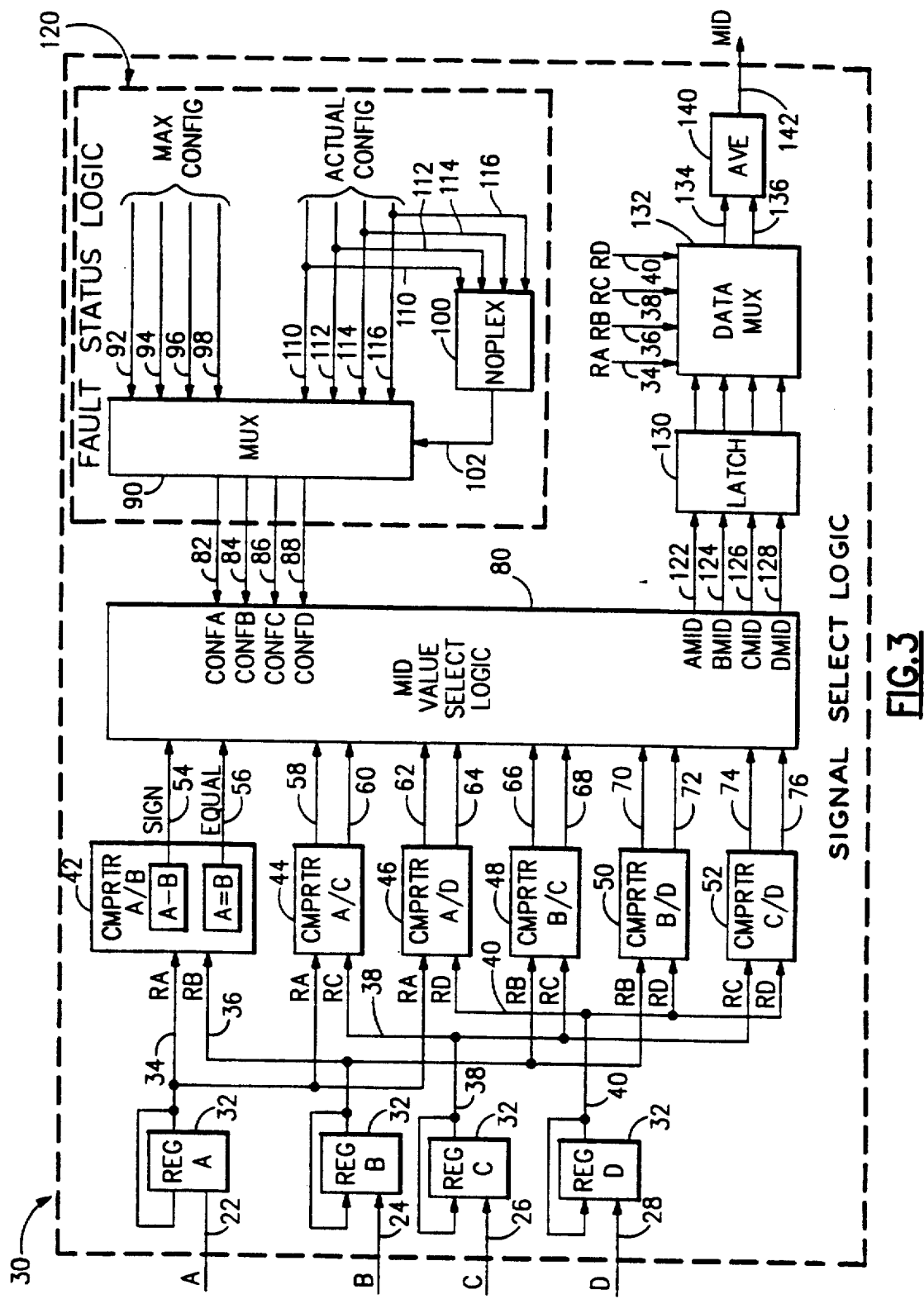
FIG. 3 is a block diagram illustration of digital logic which implements the signal selection system of the present invention, as embodied in the controller of FIG. 1.

In FIG. 3 is illustrated in greater detail a block diagram of the signal select logic 30 of the present invention. Each of the 16-bit digital signals A,B,C,D on the lines 22-28 is input, all 16 bits at once, to a corresponding 16-bit shift register 32. Each shift register shifts its contents out one bit at a time onto a corresponding signal line, RA,RB,RC,RD 34-40. The register serial output is also fed back to a serial input on each register 32, to prevent loss of data within the register.

The register outputs RA,RB,RC,RD 34-40 are also fed to appropriate comparators 42-52. Each comparator 42-52 compares a selected two of the four register outputs and provides a pair of signals on corresponding lines 54-76. For example, the first comparator 42 compares the value of RA with that of RB. The comparator provides a signal, SN, on the line 54 indicative of the sign of the result of the comparison. That is, if RA is greater than RB, SN is a logic ZERO. On the other hand, if RA is less than RB, SN is a logic ONE. If RA equals RB, the equal bit signal, EQ, on the line 56 is a logic ONE, and SN is of no concern. If A does not equal B, EQ is a logic ZERO. The foregoing is illustrated in the following truth table.

| EQ | SN | condition |
|----|----|-----------|
| 0  | 0  | A>B       |
| 0  | 1  | A<B       |
| 1  | X  | A=B       |

In a similar manner, the second comparator 44 compares the values of signals RA and RC, and provides signals on the lines 58,60 indicative of the sign and equality, respectively, of the result. The remaining comparators 46-52 compare signals RA and RD, RB and RC, RB and RD, and RC and RD, respectively, and provide the appropriate sign and equality results on the signal lines 62-76.

In accordance with one aspect of the present invention, for each of the comparators, the multiple bit digital signals RA,RB,RC,RD 34-40 are input thereto serially one bit at a time from the shift registers 32. The comparators operate on each of the 16 bits individually as they enter the comparator. The output of each comparator then becomes valid after all 16 bits of the signals have been operated on.

Thus, in accordance with this aspect of the present invention, the shift registers and comparators are implemented as bit serial logic. As compared to a parallel scheme where the shift registers are eliminated and the comparators are implemented with parallel logic, such bit serial logic reduces the amount of hardware required to implement such parallel comparison operations. However, such reduction is at the expense of throughput speed of the signal selection system. The throughput of the bit serial logic implementation is a function of the amount of bits in the multiple bit digital signals RA,RB,RC,RD (here, 16 bits). Nevertheless, in actual implementation and testing of the signal selection system of the present invention, such a system with bit serial logic still operates with significantly faster throughput than the aforementioned prior art sequential software systems.

Yet, it is to be understood that to be within the spirit of the broadest scope of the present invention, the comparators are not constrained to be implemented exclusively with bit serial logic. In accordance with another aspect of the present invention, each comparator may, if desired, be implemented with parallel logic operating on larger groups of bits. That is, the comparators may operate simultaneously on, e.g., two, four or even all 16 bits of the ADC output signals A,B,C,D 22-28. This implementation of the comparators further increases the throughput of the overall signal selection system. However, the increase in throughput is at the expense of an increase in the amount of hardware. Thus, the final implementation is a balancing test between throughput and amount of hardware.

The signal lines 54-76 from each comparator are fed to mid value select logic 80, which selects the one or two of the multiple bit digital signals A,B,C,D that represent the mid value(s) from all four of the redundant input signals. The mid value select logic 80 is described in detail hereinafter.

Also input on signal lines 82-88 to the mid value select logic are four signals: CONFA, CONFB, CONFC, CONFD. Each is a single bit digital signal indicative of the health of a corresponding one of the four inputs to the flight controller 10. For example, a logic ONE may indicate a healthy input, while a logic ZERO may indicate a faulted input. Together CONFA-CONFD 82-88 comprise a four bit word CONFIG used internally by the mid value select logic, as described in detail hereinafter.

The signals CONFA-CONFD are fed from the output of a multiplexer (MUX) 90. One set of inputs to the mux 90 comprises four signals on lines 92-98, each comprising a single bit digital signal indicative of a maximum possible unfaulted status (MAX CONFIG) of the four sensor inputs. That is, MAX CONFIG is indicative of the maximum possible number of sensors 14 (i.e., maximum redundancy level) in the flight controller 10. In the exemplary embodiment of the present invention, MAX CONFIG equals four (4) since there are four redundant sensors.

MAX CONFIG is selected to pass through to the mux output when it is determined that the system is in a "noplex" situation. A noplex situation occurs when noplex logic 100 determines that each of the four sensor inputs is in a fault condition. A fault condition may occur when a sensor input is outside of a predetermined range, perhaps as a result of an inoperable sensor. The noplex logic 100 looks at the current fault status of each of the four sensor inputs and performs a logical OR thereon. The current fault status of each sensor input is determined by known fault logic (not shown) external to the signal selection system of the present invention. Only when each sensor input is faulted will the result of the OR be a logic ZERO. In response thereto, the noplex logic outputs a signal on a line 102 to the mux 90 which causes the mux to select the MAX CONFIG bits to pass through to the mux output (CONFA-CONFD) 82-88.

A second set of inputs to the mux comprises four signals on lines 110-116, each comprising a single bit digital signal representing the current fault status of the four sensor inputs. This status is determined by the fault logic (not shown). When one or more of the inputs are healthy, the noplex logic passes the current fault status signals on the lines 110-116 to the mux output.

Together, the CONFIG bits (CONFA-CONFD) and the aforementioned logic which generates these signals comprise fault status logic 120. Armed with the fault status of each input along with the results of the comparisons between each combination of pairs of inputs, the mid value select logic 80 selects, in accordance with the present invention, the one or two of the sensor inputs that are eventually averaged into the mid value from among all the inputs. It is to be understood, however, that the fault status logic 120 and resulting bits CONFA-CONFD and their use in the equations for the mid value select described hereinafter are not necessary for the broadest scope of the present invention. The fault status logic is merely utilized in an exemplary embodiment of the present invention.

The mid value select logic comprises a parallel arrangement of digital logic which executes, either (Equ. 1-4). The equations are derived for each of the four possible situations where one of the four sensor inputs is the mid value from among all four inputs. The equations generate a four bit mid value indicator, each bit (AMID, BMID, CMID, DMID) in this indicator corresponding to one of the sensor inputs. A logic ONE in this indicator means that the associated input has been selected by the mid value select logic as one of the mid values from among all the inputs. As a general rule, the mid value indicator never has less than one, or more than two bits set (i.e., logic ONE) for any input condition. If one bit is set then the corresponding input is the mid value from among all of the sensor inputs. If two bits are set, then the mid value is the average of the corresponding two inputs.

$$\begin{aligned} \text{AMID} = &\ g11^*g1 + g7^*g5 + g10^*g1 + g7^*g4 + \\ &\ g11^*g4 + g10^*g5 + E1^*E4^*(\overline{E5}) + \\ &\ D/S^*\text{CONFA} + (\overline{\text{CONFD}})^*e1 + \\ &\ e4^*e6^*(\overline{E5}) + e1^*e2^*e3 \end{aligned} \quad \text{(Eq. 1)}$$

$$\begin{aligned} \text{BMID} = &\ g1^*g2 + g7^*g8 + g6^*g8 + g12^*g2 + \\ &\ g12^*g7 + g1^*g6 + (\overline{E1})^*E2^*E6 + \\ &\ D/S^*\text{CONFB} + (\overline{\text{CONFA}})^*e2 + e1^*e3^*(\overline{E2}) \end{aligned} \quad \text{(Eq. 2)}$$

$$\begin{aligned} \text{CMID} = &\ g2^*g3 + g8^*g9 + g9^*g10 + g3^*g4 + \\ &\ g4^*g8 + g2^*g10 + (\overline{E2})^*E3^*E4 + \\ &\ D/S^*\text{CONFC} + (\overline{\text{CONFB}})^*e3 + \\ &\ e2^*e5^*(\overline{E3}) + e1^*e3^*(\overline{E2}) \end{aligned} \quad \text{(Eq. 3)}$$

$$\begin{aligned} \text{DMID} = &\ g3^*g11 + g5^*g9 + g5^*g12 + g6^*g11 + \\ &\ g6^*g9 + g3^*g12 + (\overline{E3})^*E5^*E6 + \\ &\ D/S^*\text{CONFD} + (\overline{\text{CONFC}})^*e5 + \\ &\ e2^*e5^*(\overline{E3}) + e4^*e6^*(\overline{E5}) \end{aligned} \quad \text{(Eq. 4)}$$

where "*" indicates logical AND; "+" indicates logical OR.

Equations 1-4 determine the mid value for the exemplary signal selection system having four redundant sensors 14 along with fault status logic 120. However, it should be readily apparent, in light of the teachings herein, for one skilled in the art to derive similar equations for a system having five or more redundant sensor inputs and using ten or more pairwise comparators, or for a system without the fault status logic. Similarly, the comparison signals (sign and equal) may be used for selecting one or more signals according to any other selection criteria (e.g., the largest or smallest signal).

gN, EN, and eN used in equations 1-4 and defined hereinafter are labels representing logic operations performed on comparison signals together with signal validity (fault) indicators from fault status logic 120. The variable N equals a number from 1 to 12, each number from 1 to 12 representing a combination of two of the inputs A,B,C,D. The correlation between the number N and the various two input combinations is as follows:

| N | inputs | N | inputs |
|---|--------|---|--------|
| 1 | A,B    | 7 | B,A    |
| 2 | B,C    | 8 | C,B    |
| 3 | C,D    | 9 | D,C    |
| 4 | A,C    | 10| C,A    |
| 5 | A,D    | 11| D,A    |
| 6 | B,D    | 12| D,B    | gN, EN, and eN are defined for each of the combinations of inputs (N=from 1 to 12) as follows:

N = 1
g1: A > B and A is valid and B is valid
E1: A = B or A is invalid or B is invalid
e1: A = B and A is valid and B is valid
N = 2
g2: B > C and B is valid and C is valid
E2: B = C or B is invalid or C is invalid
e2: B = C and B is valid and C is valid g3-g12, E3-E12, and e3-e12 are defined in a similar manner.

In the definitional equations above for g1, E1, and e1 (i.e., gN, EN, and eN when N=1), the following represent those equations with the appropriate logic levels for EQ, SN and the CONFIG bits CONFA - CONFD inserted therein.

g1: $(\overline{EQ}) \cdot (\overline{SN}) \cdot CONFA \cdot CONFB$
E1: $EQ + (\overline{CONFA}) + (\overline{CONFB})$
e1: $EQ \cdot CONFA \cdot CONFB$ Note, D/S (Duplex/Simply) in equations 1-4 is generated within the select logic 30 and is a logic ONE whenever CONFIG is in the duplex or simplex mode, and is a logic ZERO otherwise for triplex quad select system selection. In other words, D/S is a logic ONE when CONFA - CONFD represent system with two or three faulted signals. If one of the sensor inputs is faulted, the normally quad select system automatically becomes "triplex" system; if two bits are faulted, a "duplex" system, and if three bits are faulted, a "simplex" system.

In generating the equations for AMID, BMID, CMID and DMID, the following generic design rules apply which govern mid value selection and correspond various input conditions:

| input condition | mid value input to Avergers |
|-----------------|------------------------------|
| A > B > C > D   | B and C                      |
| (A = B) > C > D | C                            |
| A > (B = C) > D | B or C                       |
| A > B > (C = D) | B                            |
| (A = B = C) > D | A or B or C                  |
| A = B = C = D   | A or B or C or D             |
| (A = B) <> (C = D) | (A or B) and (C or D)     |

The four bits AMID-DMID are output from the mid value select logic on corresponding signal lines 122-128 to a latch 130 and then fed to a data mux 132. Also input to the data mux on signal lines are the shift register output signals RA,RB,RC,RD 34-40. AMID-DMID serve to select which of the shift register output signals are fed to the data mux output, which comprises a pair of signal lines 134,136. If the mid value indicator indicates that only one of the bits AMID-DMID is set, then the corresponding one of the signals RA,RB,RC,RD is fed to both data mux output lines 134,136. Averaging logic 140 then takes the average of the two signals and provides an averaged signal (MID) on a line 142 at an output. MID 142 is the value of the "best" input which represents the current mid value from among all of the currently valid sensor inputs.

On the other hand, if the mid value indicator indicates two of the bits AMID-DMID are set, then one data mux output line 134 contains one of the corresponding inputs RA,RB,RC,RD indicated to be a mid value, while the second data mux output line 136 contains the second of the corresponding inputs RA,RB,RC,RD indicated to be a mid value. The average logic 140 calculates the average of those two inputs and provides the average signal MID 142. It should be understood that equations 1-4 are designed such that no more than two of the bits AMID-DMID will ever be set.

In a similar manner to the comparators described hereinbefore, the data mux 132 may be implemented in bit serial logic so as to reduce hardware. This situation is illustrated in FIG. 3 where the shift register outputs RA,RB,RC,RD 34-40 are fed to the data mux. However, the data mux may, if desired, be implemented in parallel logic. If implemented with parallel logic, the data mux would have as input all 16 bits at once of each of the signals A,B,C,D 22-28 from the ADCs 20. As with the comparators, the use of either bit serial logic or parallel logic involves a trade-off between throughput speed and amount of hardware.

Also, it is to be understood that the latch 130, the data mux 132, and the averaging circuit 140 are not required for the broadest scope of the present invention. This circuitry is merely exemplary of a scheme for processing the input signals RA,RB,RC,RD and generating a selected signal MID according to the mid value selection criterion. A different criteria may require, for example, the arithmetic addition of the signals selected by the selection logic.

The entire signal selection system hardware of FIG. 3 may, if desired, be easily implemented in known, commercially available programmable/erasable logic devices (PLDs), such as those available from Altera Corp., San Jose Calif., in a manner which should be readily apparent to one of ordinary skill in the art. Each PLD contains the equivalent of hundreds of popular 7400-series TTL logic devices. Altera provides software for use on a personal computer workstation which simplifies the task of entering logic equations, such as equations 1-4 described hereinbefore which are to be executed in accordance with the present invention, and schematic logic diagrams. Once all the logic design parameters have been entered, the Altera system automatically programs the PLD device with the appropriate logic, which can then be inserted into a larger electronic implementation of a system such as the flight control system of FIG. 1.

Although the invention has been illustrated and described with respect to an exemplary embodiment thereof, it should be understood by those skilled in the art that the foregoing and various other changes, omissions, and additions in the form and detail thereof may be made without departing from the spirit and scope of the invention.

We claim:

1. A signal selection system, having input thereto a plurality of input signals with varying values, each input signal having a multiple bit digital format representing the value of the input signal, the system comprising:

comparison means, for simultaneously comparing all possible pairwise combinations of the input signals to determine which input signal in each of the input signal pairs has the greater value and to determine if both input signals in each of the input signal pairs have equal values, and for providing corresponding comparison signals indicative of the result of said simultaneous comparing;

selection means, responsive to said comparison signals, for determining the one or more of the plurality of input signals that meets a predetermined mid value selection criterion, said selection means having a plurality of combinational logic elements arranged to execute predetermined Boolean logic equations in determining the one or more of the plurality of input signals whose value represents a mid value from among the plurality of input signals, and for providing a mid value indicator signal indicative of the one or more of the input signals whose value represents said mid value from among the plurality of input signals; and multiplexer means, responsive to said mid value indicator signal, for selecting to appear at an output of said multiplexer means one or more mid value signals indicative of the one or more of the plurality of input signals whose value represents said mid value from among the plurality of input signals.

2. The signal selection system of claim 1, wherein said output of said multiplexing means comprises a pair of output signals, said multiplexing means further comprising means for selecting to appear in a first instance on both of said output signals the single one of the plurality of input signals whose value represents said mid value from among the plurality of input signals, and for selecting to appear in a second instance on a first one of said output signals a first one of the plurality of input signals whose value represents said mid value from among the plurality of input signals and for selecting to appear in said second instance on a second one of said output signals a second one of the plurality of input signals whose value represents said mid value from among the plurality of input signals.

3. The signal selection system of claim 2, further comprising:

averaging means, responsive to said pair of output signals of said multiplexing means, for providing an average value signal indicative of the average of said mid value which appears on said pair of output signals of said multiplexing means.

4. The signal selection system of claim 1, wherein said multiplexer means comprises bit serial logic means, for selecting the one or more of the plurality of input signals whose value represents said mid value from among the plurality of input signals to appear in a bit serial manner at said output of said multiplexer means.

5. A signal selection system, having input thereto a plurality of input signals with varying values, each input signal having a multiple bit digital format representing the value of the input signal, the system comprising:

comparison means, for simultaneously comparing all possible pairwise combinations of the input signal to determine which input signal in each of the input signal pairs has the greater value and to determine if both input signals in each of the input signal pairs have equal values, and for providing corresponding comparison signals indicative of the result of said simultaneous comparing;

selection means, responsive to said comparison signals, for determining the one or more of the plurality of input signals that meets a predetermined mid value selection criterion, said selection means having a plurality of combinational logic elements arranged to execute predetermined Boolean logic equations in determining the one or more of the plurality of input signals whose value represents a mid value from among the plurality of input signals, and for providing a mid value indicator signal indicative of the one or more of the input signals whose value represents said mid value from among the plurality of input signals; and fault logic means, for providing a plurality of fault signals to said selection means, each of said fault signals being indicative of how a corresponding one of the plurality of input signals is to be used by said selection means, said fault signals being provided in a first instance when all of the plurality of input signals are in a failed condition, said fault signals in said first instance being indicative of a maximum number of the plurality of input signals, and said fault signals being alternatively provided in a second instance when not all of the plurality of input signals are in a failed condition, said fault signals in said second instance being indicative of the actual health status of the plurality of input signals; and said selection means comprising means responsive to said fault signals for determining which one or more of the plurality of input signals meets said predetermined mid value selection criterion.

6. The signal selection system of claims 1 or 5, wherein said comparison means comprises bit serial logic means, for simultaneously comparing, for all possible pairwise combinations of the input signals, each of the multiple bit digital values of the input signals serially one bit at a time to determine which input signal in each of the input signal pairs has the greater value and to determine if both input signals in each of the input signal pairs have equal values, and for providing said comparison signals as a result of said simultaneous comparing.

7. A signal selection system, comprising:

means, for providing a plurality of input signals with varying values, each of said input signals having a multiple bit digital format representing a value of said input signal;

comparison means, for simultaneously comparing all possible pairwise combinations of said input signals to determine which of said input signals in each of said input signal pairs has the greater value and to determine if said input signals in each of said input signal pairs have equal values, and for providing corresponding comparison signals indicative of the result of said simultaneous comparing;

selection means, responsive to said comparison signals, for determining which one or more of said plurality of input signals meets a predetermined mid value selection criterion, said selection means having a plurality of combinational logic elements arranged to execute predetermined Boolean logic equations in determining which one or more of said plurality of input signals whose value represents a mid value from among said plurality of input signals, and for providing a mid value indicator signal indicative of said one or more of said input signals whose value represents said mid value from among the plurality of input signals; and multiplexer means, responsive to said mid value indicator signal, for selecting to appear at an output of said multiplexer means said one or more of said plurality of input signals whose value represents said mid value from among said plurality of input signals.

8. The signal selection system of claim 7, wherein said multiplexer means comprises bit serial logic means for selecting said one or more of said plurality of input signals whose value represents said mid value from among said plurality of input signals to appear in a bit serial manner at said output of said multiplexer means.

9. The signal selection system of claim 7, wherein said output of said multiplexer means comprises a pair of output signals, said multiplexing means further comprising means for selecting to appear in a first instance on both of said output signals said one of said plurality of input signals whose value represents said mid value from among said plurality of input signals, and for selecting to appear in a second instance on a first one of said output signals a first one of said plurality of input signals whose value represents said mid value from among said plurality of input signals and for selecting to appear in said second instance on a second one of said output signals a second one of said plurality of input signals whose value represents said mid value from among said plurality of input signals.

10. The signal selection system of claim 9, further comprising:
averaging means, responsive to said pair of output signals of said multiplexing means, for providing an average value signal indicative of an average of said mid value which appears on said pair of output signals of said multiplexing means.

11. A signal selection system, comprising means, for providing a plurality of input signals with varying values, each of said input signals having a multiple bit digital format representing a value of said input signal;

comparison means, for simultaneously comparing all possible pairwise combinations of said input signals to determine which of said input signals in each of said input signal pairs has the greater value and to determine if said input signals in each of said input signal pairs have equal values, and for providing corresponding comparison signals indicative of the result of said simultaneous comparing;

selection means, responsive to said comparison signals, for determining which one or more of said plurality of input signals meets a predetermined mid value selection criterion, said selection means having a plurality of combinational logic elements arranged to execute predetermined Boolean logic equations in determining which one or more of said plurality of input signals whose value represents a mid value from among said plurality of input signals, and for providing a mid value indicator signal indicative of said one or more of said input signals whose value represents said mid value from among the plurality of input signals; and fault logic means, for providing a plurality of fault signals to said selection means, each of said fault signals being indicative of how a corresponding one of the plurality of input signals is to be used by said selection means, said fault signals being provided in a first instance when all of the plurality of input signals are in a failed condition, said fault signals in said first instance being indicative of a maximum number of the plurality of input signals, and said fault signals being alternatively provided in a second instance when not all of the plurality of input signals are in a failed condition, said fault signals in said second instance being indicative of the actual health status of the plurality of input signals; and said selection means comprising means responsive to said fault signals for determining which one or more of the plurality of input signals meets said predetermined mid value selection criterion.

12. The signal selection system of claim 7 or 11, further comprising:

sensing means, for sensing a plurality of analog signals and for providing corresponding sensed signals indicative thereof;

signal converter means, responsive to said sensed signals, for converting each of said sensed signals to a multiple bit digital format and for providing in response thereto said plurality of input signals indicative thereof.

13. The signal selection system of claim 7 or 11, wherein said comparison means comprises bit serial logic means, for simultaneously comparing, for all possible pairwise combinations of said input signals, each of said multiple bit digital values of said input signals serially one bit at a time to determine which input signal in each of said input signal pairs has the greater value and to determine if both input signals in each of said input signal pairs have equal values, and for providing said comparison signals as a result of said simultaneous comparing.

14. The signal selection system of claims 1, 5, 7 or 11 wherein said plurality of input signals comprises four input signals A,B,C,D, and said predetermined Boolean logic equations comprise:

$$AMID = g11^*g1 + g7^*g5 + g10^*g1 + g7^*g4 + g11^*g4 + g10^*g5 + E1^*E4^*(E5) + D/S^*CONFA + (CONFD)^*e1 + e4^*e6^*(E5) + e1^*e2^*e3 \quad \text{(Eq. 1)}$$

$$BMID = g1^*g2 + g7^*g8 + g6^*g8 + g12^*g2 + g12^*g7 + g1^*g6 + (E1)^*E2^*E6 + D/S^*CONFB + (CONFA)^*e2 + e1^*e3^*(E2) \quad \text{(Eq. 2)}$$

$$CMID = g2^*g3 + g8^*g9 + g9^*g10 + g3^*g4 + g4^*g8 + g2^*g10 + (E2)^*E3^*E4 + D/S^*CONFC + (CONFB)^*e3 + e2^*e5^*(E3) + e1^*e3^*(E2) \quad \text{(Eq. 3)}$$

$$DMID = g3^*g11 + g5^*g9 + g5^*g12 + g6^*g11 + g6^*g9 + g3^*g12 + (E3)^*E5^*E6 + D/S^*CONFD + (CONFC)^*e5 + e2^*e5^*(E3) + e4^*e6^*(E5) \quad \text{(Eq. 4)}$$

| N | inputs | N | inputs |
|---|--------|----|--------|
| 1 | A,B | 7 | B,A |
| 2 | B,C | 8 | C,B |
| 3 | C,D | 9 | D,C |
| 4 | A,C | 10 | C,A |
| 5 | A,D | 11 | D,A |
| 6 | B,D | 12 | D,B | where $g(N)$: $I_1(N) > I_2(N)$ and $I_1$ is valid and $I_2$ is valid;

$E(N)$: $I_1(N) = I_2(N)$ or $I_1$ is invalid or $I_2$ is invalid;

$e(N)$: $I_1(N) = I_2(N)$ and $I_1$ is valid and $I_2$ is valid;

and where

"*" indicates logical AND; "+" indicates logical OR;

D/S = 1 for duplex or simplex operation and 0 otherwise; CONFA - CONFD = the fault status of the input signals.

* * * * *